(12) United States Patent
Lafortune

(10) Patent No.: US 11,221,844 B2
(45) Date of Patent: Jan. 11, 2022

(54) AUTOMATED APPLICATION PARTITIONING SYSTEM

(71) Applicant: GUARDSQUARE NV, Leuven (BE)

(72) Inventor: Eric Lafortune, Herent (BE)

(73) Assignee: PNC BUSINESS CREDIT, West (GB)

( * ) Notice: Subject to any disclaimer, the term of this patent is extended or adjusted under 35 U.S.C. 154(b) by 0 days.

(21) Appl. No.: 16/110,065

(22) Filed: Aug. 23, 2018

(65) Prior Publication Data
US 2019/0079756 A1    Mar. 14, 2019

(51) Int. Cl.
| | | |
|---|---|---|
| *G06F 8/71* | (2018.01) | |
| *G06F 8/61* | (2018.01) | |
| *G06F 8/41* | (2018.01) | |
| *G06F 8/75* | (2018.01) | |
| *G06F 9/445* | (2018.01) | |
| *G06F 9/455* | (2018.01) | |

(52) U.S. Cl.
CPC .............. *G06F 8/71* (2013.01); *G06F 8/433* (2013.01); *G06F 8/61* (2013.01); *G06F 8/75* (2013.01); *G06F 9/44521* (2013.01); *G06F 9/45504* (2013.01)

(58) Field of Classification Search
None
See application file for complete search history.

(56) References Cited

U.S. PATENT DOCUMENTS

| | | | |
|---|---|---|---|
| 2008/0148277 A1* | 6/2008 | di Flora | G06F 8/443 719/313 |
| 2012/0278439 A1 | 11/2012 | Ahiska et al. | |
| 2014/0053148 A1* | 2/2014 | Chan | G06F 8/41 717/174 |
| 2014/0122302 A1* | 5/2014 | Tofighbakhsh | G06F 3/01 705/27.1 |
| 2016/0170712 A1* | 6/2016 | Luan | G06F 8/71 717/121 |
| 2016/0202967 A1* | 7/2016 | Misra | G06F 8/74 717/120 |
| 2017/0177319 A1* | 6/2017 | Mark | G06F 8/61 |

OTHER PUBLICATIONS

Extended European Search Report from EP Application No. 17190250. 5, dated Mar. 16, 2018.
"DexGuard," 2016; retrieved from https://www.guardsquare.com/en/dexguard on Jun. 4, 2018, 5 Pages.
"Google Play Instant," retrieved from https://developer.android.com/topic/google-play-instant/ on Jun. 29, 2018, 21 Pages.

(Continued)

*Primary Examiner* — Wynuel S Aquino
(74) *Attorney, Agent, or Firm* — Workman Nydegger

(57) ABSTRACT

An automated application partitioning system is configured to receive a software application, and a specification of two or more entry points of the software application. The automated application partitioning system, by means of a dependence analysis groups application components, such that there is provided for each entry point dependency subset a corresponding feature subset, and at least one shared subset.

12 Claims, 5 Drawing Sheets

(56) References Cited

OTHER PUBLICATIONS

"IXGuard, Cutting Edge Protection for your iOS apps and SDKs," retrieved from https://guardsquare.com/en/products/ixguard on Jun. 29, 2018, 4 Pages.

"Make Your App Instant," retrieved from https://medium.com/jet-stories/make-your-app-instant-33855ab5d02b on Jun. 29, 2018, 10 Pages.

"Proguard, The Open Source Optimizer for Java Bytecode," retrieved from https://www.guardsquare.com/en/proguard on Jun. 4, 2018, 5 Pages.

* cited by examiner

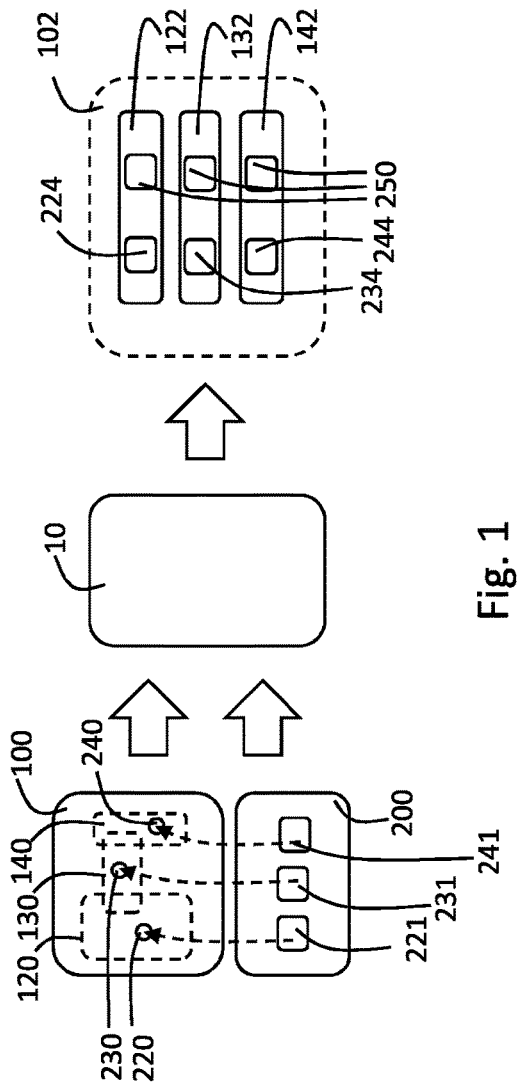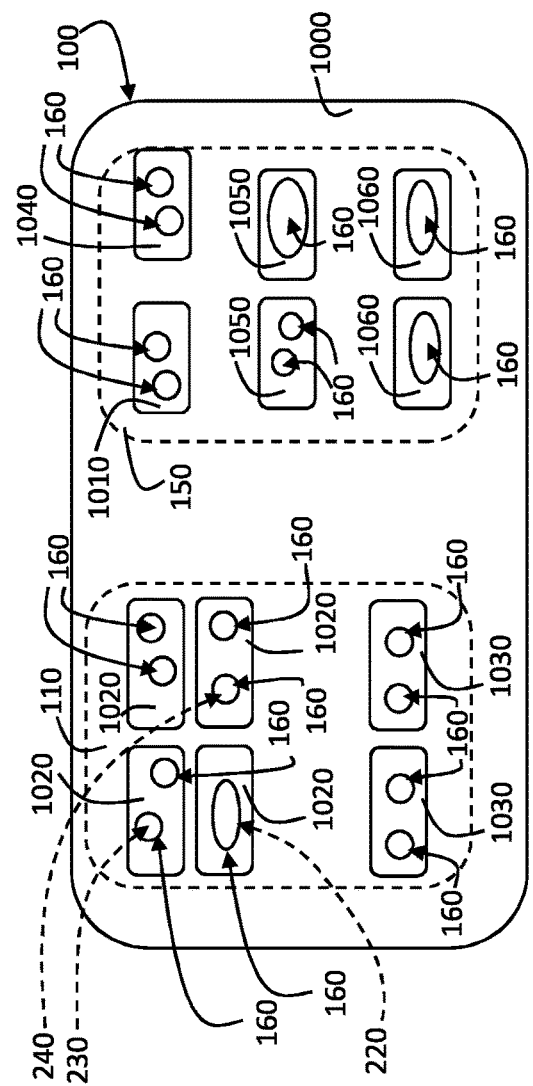

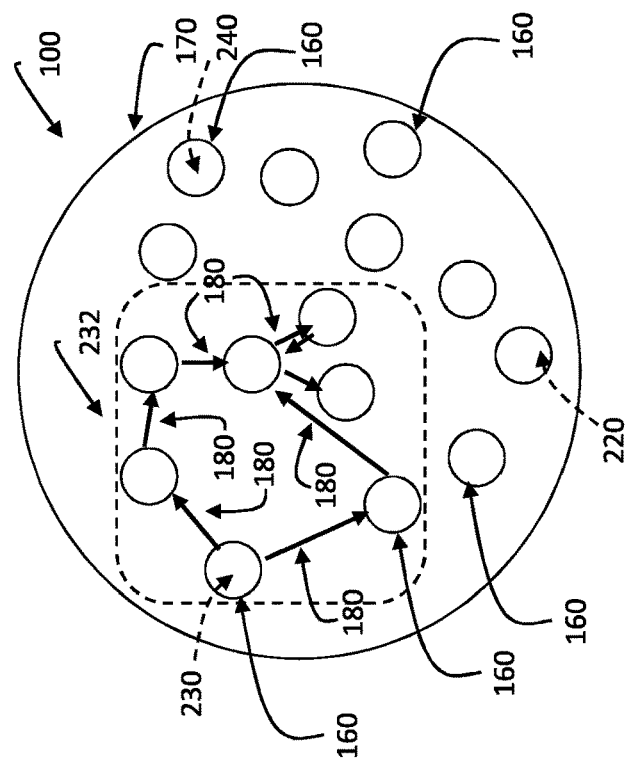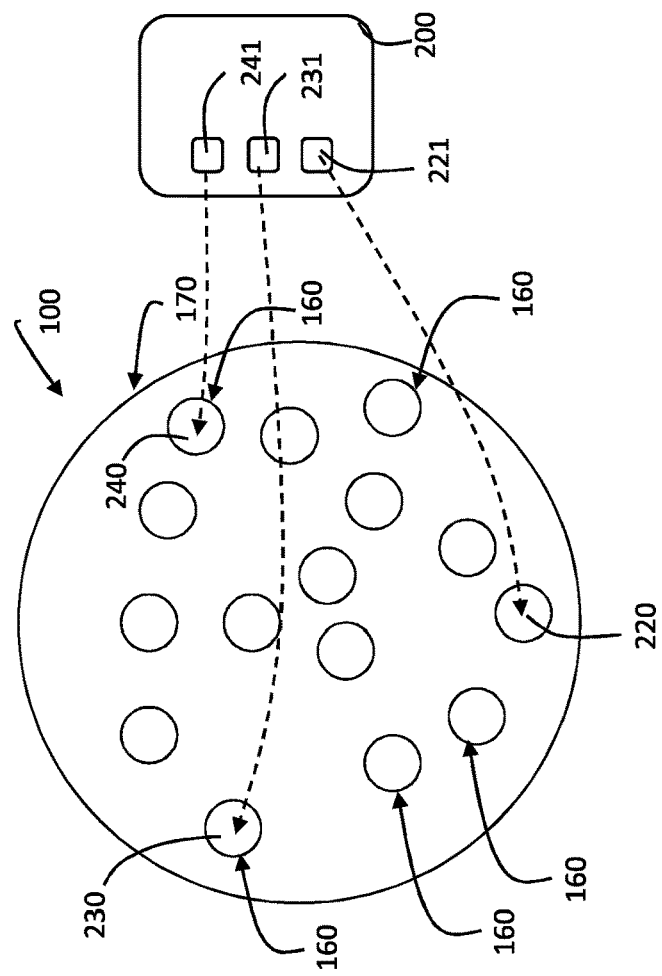

AUTOMATED APPLICATION PARTITIONING SYSTEM

TECHNICAL FIELD

The invention concerns an automated application partitioning system and computer implemented method. More particularly an automated application partitioning system for a software application comprising two or more entry points of the software application for initiating execution of two or more corresponding subsets of the software application.

BACKGROUND

Software applications, such as for example mobile software applications or mobile apps, require a download, configuration and subsequent installation on the user device of the entire mobile software application package before the functionality of the application is available on the user device. Typically such download, configuration and installation on the user device must be performed by means of accessing a particular mobile application referred to as an application store, such as for example the "Google Play" application for distributing applications to Android compatible user devices, the "App Store" application for distributing applications to iOS compatible user devices, . . . . Developers typically must provide the software application to the application store in a predetermined application package compatible with the application store and/or the user devices and their operating system which the application store serves. As generally known to a person skilled in the art, software applications for user devices running the Android operating system are for example packaged as .apk package files according to the Android Package Kit or APK package file format. Similarly, software applications for user devices running alternative operating systems are typically provided as a predetermined application package, such as for example an .ipa file or an iOS application archive file which stores an iOS app for user devices running the iOS operating system, a .xap file for user devices running the Windows Phone operating system, etc. Before a user can make use of a particular software application, typically a user needs to actively perform a number of manual actions in such an application before the desired mobile application is available for execution on the mobile device. The user must typically perform these manual actions: find and select the mobile application in the user interface of that particular application store; download the mobile application; configure the mobile application for example by accepting the required permissions; and subsequently launch the mobile application on the user device.

It is clear that such a process forms a hurdle for users to initiate usage of mobile apps, or other similar software applications. The plurality of manual steps, the need to download the application entirely and the related configuration, etc. prevent instantaneous usage of the software application. This reduces the number of users that actually start using such software applications.

In order to lower the hurdle for making use of such software applications it has been proposed to partition the software application in a plurality of smaller parts, which can be automatically downloaded and used more instantaneously, while still providing similar benefits of a software application installed on a user device as compared to a remote software application for example known as a web application or web App, such as for example direct access to hardware of the user device, offline operation, appearance in the application store, . . . .

One known example of such a solution is known as Android Instant Apps: https://developer.android.com/topic/instant-apps/index.html for user devices comprising the Android operating system. Such software applications are accessible from a web browser via a URL without installation. In order to accomplish this the software application is partitioned into a number of smaller independently executable applications referred to as features. These features are provided as a set of .apk files which can be downloaded and run independently of one another. When the user accesses the Instant App via a URL an initial feature of the software application is downloaded and executed. When the user accesses functionality provided by another feature of the software application, that feature is then downloaded and executed. In this way, the software application can be instantly executed without the need for the download, installation and configuration of the entire software application. According to the Android Instant App framework, there is allowed in addition to the features, a single small shared partition of the software application, referred to as a base feature, in which code and resources shared among a plurality of features can be arranged. It is clear that, in order to provide the perception of instantaneous availability of the software application, it is preferred that the partitions of the software application are smaller than a predetermined maximum size limit. For the Android Instant Apps, this currently means that the size of each feature when summed with the size of the optional base feature must remain smaller than 4 MB.

When developing such a software application, this imposes requirements with respect to the modularity of the application code and resources, which need to be assured by the developers, such that each partition of the software application can be compiled into a set of separately executable smaller applications. This puts a high burden on the developers in case of development of a new software application, however, the burden is even higher when it is desired to restructure an existing software application so that it can be provided in a more instantaneous way.

It has for example been found that the development time spent at converting a non-trivial mobile App to a mobile App compatible with the Android Instant App framework is in the order of a plurality of weeks, such as for example documented on https://medium.com/jet-stories/make-your-app-instant-33855ab5d02b. Especially, partitioning the application code and resources of the software application into separately executable feature applications, requires a lot of effort. Especially analysing for each feature application, on which parts of the software application its successful execution depends is a complex, difficult and time-consuming activity when trying to achieve feature applications of which the size is minimized but still remain functional. Further also, the interaction between different features of the mobile App, affect the application code and any change to the design of the mobile App, such as for example an addition, removal, modification, refactoring of the features has a major impact on the application code.

Thus, there is a need for an automated application partitioning system which overcomes the above-mentioned problems, enabling a more efficient partitioning of a software application into a plurality of separately executable feature applications, and reduces the problems with respect to flexibility and complexity during development of the software application.

SUMMARY

According to a first aspect of the invention there is provided an automated application partitioning system, configured to:
receive a software application;
receive entry point specifications of two or more different entry points of the software application, thereby defining two or more corresponding application features;
determine a set comprising a plurality of dependent application components of the application features of the software application;
execute a dependence analysis in which, starting from the entry point of each application feature, there is determined a corresponding entry point dependency subset comprising all dependent application components required for enabling execution of the application feature;
group the application components, such that there is provided:
for each entry point dependency subset, a corresponding feature subset respectively comprising all application components which are only part of the corresponding entry point dependency subset and not of another entry point dependency subset; and
at least one shared subset comprising application components part of a plurality of dependency subsets.

In this way, the partitioning of a software application can be performed in a more efficient way. The automated application partitioning system allows to reduce the work to refactor and repartition a software application in a shorter time period, such as for example a few minutes or less, as compared to the prior art solution which would lead to a time period of for example a few weeks. Additionally, the problems with respect to flexibility and complexity during development of the software application are reduced. The developer only needs to specify the entry points for the plurality of application features and the automated partitioning system will automatically determine and group the application components in a way that supports separate execution of each application feature. This is particularly advantageous, when for example adapting an existing software application to make it available in a more instantaneous way, as the developer only needs to specify the entry points. It also improves flexibility, as removing, adding, modifying, . . . of separately executable feature applications can be enabled by modification of the provided entry points, without the need for an extensive and elaborate manual analysis, coordination, modification of the application code during the development process of the software application.

According to an embodiment, there is provided an automated application partitioning system, configured to:
receive a software application comprising application code;
receive a specification of two or more entry points of the application code for initiating execution of two or more corresponding subsets of the application code thereby providing two or more corresponding application features when executed;
determine a set comprising a plurality of dependent application components, such that each entry point of the application code is arranged in a separate application component;
execute a dependence analysis in which, for each application component comprising an entry point of an application feature, there is determined a corresponding entry point dependency subset comprising all dependent application components required for enabling execution of the corresponding application feature are determined;
group the application components, such that there is provided:
for each entry point dependency subset, a corresponding feature subset respectively comprising all application components which are only part of the corresponding entry point dependency subset and not of another entry point dependency subset; and
at least one shared subset comprising application components part of a plurality of dependency subsets.

In this way, it is clear that the specification of the entry points can be provided by means of a reference to a particular item or part of the application code, which allows initiation of the execution of a particular application feature by a suitable processor. However, it is clear that alternative embodiments are possible, such as for example a specification of the entry points that refers to a particular entry or reference, for example in a resource of the software application. The specification of the entry points could for example comprise a reference to an entry in the manifest file of an Android software package which allows for the initiation of the execution of a particular application feature of the software application. Software applications for the Android operating system are particularly suited for being processed by the automated partitioning system as such applications typically comprise multiple entry points which define application features, such as for example activities and services, which the Android operating system can instantiate and run as needed. It is however clear that alternative software applications running on alternative operating systems are also suitable for being processed by the automatic application partitioning system, as long as a plurality of entry points can be specified for a plurality of separately executable application features of the software application.

According to a further embodiment, there is provided an automated application partitioning system, wherein the automated application partitioning system is configured to group the application components such that there is provided one shared subset comprising all application components part of a plurality of dependency subsets.

In this way, a particularly simple partitioning is obtained, in which each feature subset only depends on the same single shared subset.

According to a further embodiment, there is provided an automated application partitioning system, wherein the software application comprises: application code; and resources comprising data available to the application code of the software application.

In this way, not only the application code, but also all resources are automatically partitioned to the corresponding feature subset or shared subset.

According to a further embodiment, there is provided an automated application partitioning system, wherein an application component respectively comprises:
a part of the application code of the software application; and/or
a part of the resources.

In this way, a respective application component for example at least partly comprises one or more classes, fields, methods, instructions, routines, . . . of the application code. Alternatively, the respective application component for example at least partly comprises data from a resource file, asset file, . . . of an application package.

According to a further embodiment, there is provided an automated application partitioning system, wherein the automated application partitioning system is further configured to remove any application components from the set which are not part of at least one entry point dependency sub set.

This reduces the size of the partitioned application and its application features.

According to a further embodiment, there is provided an automated application partitioning system, wherein the software application is automatically adapted such that for the number of dependency relations between the application components of the set is reduced.

This further optimizes the performance of the partitioned application as the partitioning can be optimized such that the need for loading other partitions of the partitioned application during execution of the partitioned application is reduced.

According to a further embodiment, there is provided an automated application partitioning system, wherein the automated application partitioning system is further configured to replace any direct call for an application component of another feature subset or shared subset by an indirect call to the location where that application component and its feature subset or shared subset will be retrievable.

In this way, the application code is automatically adapted to handle any dependencies between the different feature subsets and the shared subset indirectly, which ensures that the partitioned application is executable in an optimized way, without the need to take into account a particular partitioning scheme during development of the software application.

According to a further embodiment, there is provided an automated application partitioning system, wherein:
the software application is received as a software package;
the entry point specifications of two or more entry points is
    received as part of a configuration file for the automated application partitioning system.

According to a further embodiment, there is provided an automated application partitioning system, wherein the automated application partitioning system is further configured to generate the respective application features as a software package comprising the corresponding feature subset and the shared subsets from which this feature subset depends.

In this way, the partitioned application can be made available as a set of separately executable application packages.

According to a further embodiment, there is provided an automated application partitioning system, wherein the application code comprises one or more of the following:
source code;
byte code;
native code.

In this way, the application partitioning system can be applied before, during and/or after compilation, both on application code provided by the developer of the software application as well as for example on the application code resulting from standard software libraries of the software application. It is clear that the term application code, in the context of this description, thus relates to all software code of the software application.

According to a further embodiment, there is provided an automated application partitioning system, wherein the automated application partitioning system is further configured to group the application components, such that each feature subset and/or shared subset is respectively smaller than or equal to a predetermined maximum size threshold. According to a further embodiment, there is provided an automated application partitioning system, wherein the predetermined maximum size threshold is preferably in the range of 2 MB to 20 MB, preferably in the range of 2 MB to 6 MB, for example 4 MB.

In this way, the size of the part of the partitioned software application which needs to be available for execution is small enough to be perceived as instantaneously available.

According to a second aspect of the invention, there is provided a computer implemented method for operating the automated application partitioning system according to any of the preceding claims, wherein the method comprises the steps of:
receiving a software application;
receiving entry point specifications of two or more different
    entry points of the software application thereby defining
    two or more corresponding application features;
determining a set comprising a plurality of dependent application components of the application features of the software application;
executing a dependence analysis in which, starting from the entry point of each application feature, there is determined a corresponding entry point dependency subset comprising all dependent application components required for enabling execution of the application feature;
group the application components, such that there is provided:
    for each entry point dependency subset, a corresponding feature subset respectively comprising all application components which are only part of the corresponding entry point dependency subset and not of another entry point dependency subset; and
    at least one shared subset comprising application components part of a plurality of dependency subsets.

According to an embodiment, there is provided a computer implemented method for operating the automated application partitioning system according to the first aspect of the invention, wherein the method comprises the steps of:
receiving a software application comprising application code;
receiving a specification of two or more entry points of the application code for initiating execution of two or more corresponding subsets of the application code thereby providing two or more corresponding application features when executed;
determining a set comprising a plurality of dependent application components, such that each entry point of the application code is arranged in a separate application component;
executing a dependence analysis in which, for each application component comprising an entry point of an application feature, there is determined a corresponding entry point dependency subset comprising all dependent application components required for enabling execution of the corresponding application feature;
group the application components, such that there is provided:
    for each entry point dependency subset, a corresponding feature subset respectively comprising all application components which are only part of the corresponding entry point dependency subset and not of another entry point dependency subset; and
    at least one shared subset comprising application components part of a plurality of dependency subsets.

According to still further embodiments there are provided computer-implemented methods for operating the automated partitioning system similar as described with reference to the embodiments of the automated partitioning system.

According to a third aspect of the invention, there is provided a computer readable storage medium comprising computer-executable instructions which, when executed by a computing system, perform the computer-implemented method according to the second aspect of the invention.

BRIEF DESCRIPTION OF THE DRAWINGS

Exemplary embodiments will now be described with reference to the drawings in which:

FIG. 1 schematically shows an embodiment of the automated application partitioning system;

FIG. 2 schematically shows an embodiment of the software application of FIG. 1;

FIGS. 3 to 7 schematically show embodiments of the software application during processing by means of the automated application partitioning system of FIG. 1;

DETAILED DESCRIPTION OF EMBODIMENT(S)

Figure 6:
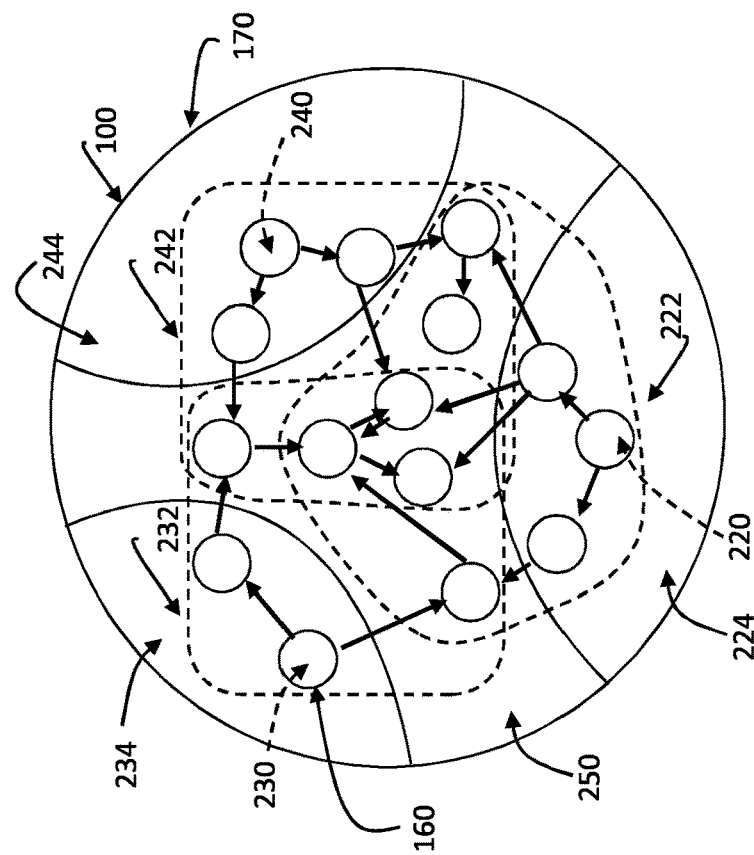

FIG. 1 shows an embodiment of an automated application partitioning system 10. As shown, according to this embodiment the automated application partitioning system 10 receives as input a software application 100. According to this embodiment, and as will be described in more detail below with reference to the embodiment of FIG. 2, the software application 100 comprises application code 110 and resources 112. It is clear that further alternative embodiments of a software application 100 are possible, for example comprising still further elements in addition to the application code 110 and the resources 112, as long as in general the software application 100 at least comprises the application code 110.

As further shown the application partitioning system 10 further also receives as input a specification 200 comprising entry point specifications 221, 231, 241 of three entry points 220, 230, 240. It is clear that alternative embodiments are possible in which the specification 200 comprises entry point specifications 221, 231, 241 of any suitable number of entry points 220, 230, 240, as long as in general the specification 200, by means of the entry point specifications, specifies two or more entry points of the software application 100. According to the embodiment shown these three entry points 220, 230, 240 of the software application 100 define three corresponding predetermined items of the software application 100 at which the execution of three particular subsets 120, 130, 140 of the software application 100 can be initiated, such that when executed these particular subsets 120, 130, 140 of the software application 100 provide for three corresponding application features 122, 132, 142. Each of the application features 122, 132, 142, as already mentioned above, thus respectively providing for a separately executable part of the partitioned software application 102. In this way, this allows execution of the software application 100 to be initiated by means of one of the separately executable application features 122, 132, 142, without the need to download, install and/or configure the software application 100 in its entirety. These application features 122, 132, 142, could also be referred to as separately executable software modules of the software application 100. For example, according to an embodiment of an e-commerce shopping software application 100, the application features 122, 132, 142 could respectively comprise: the provision of a search interface for inputting and processing a search query for an item for sale on the e-commerce shopping software application 100; the presentation of result list comprising the items retrieved by means of the search query; and a checkout functionality for one or more of the items selected from the result list of the software application 100. It is clear that the respective part of the software application 100 required for each of these application features 122, 132, 142 thus forms a respective particular corresponding subset 120, 130, 140 of the overall software application 100. Such a subset 120, 130, 140 preferably thus only comprises the respective parts of the application code 110 and resources 150 required for enabling the functionality of the corresponding application feature 122, 132, 142, when executed. As will be explained in further detail below, it is clear that the subsets 120, 130, 140 of the software application 100 could be at least partly overlapping. It is further clear that the entry point specifications 221, 231, 241 of the entry points 220, 230, 240 only needs to provide a suitable reference to an item in or of the software application 100 for allowing the initiation of the corresponding application feature 122, 132, 142 of the partitioned application 102 when executed.

According to the embodiment shown in FIG. 2, there is shown an exemplary software application 100 provided as an application package 1000. According to a particular embodiment this could for example be an application package 1000 according to the Android Package Kit or APK package file format, also referred to as a .apk file already mentioned above, suitable for use on user devices comprising the Android operating system. As shown, the application package 1000 of the software application 100 comprises for example the following items in the form of application code 110 and resources 150 as generally known to a man skilled in the art:

A manifest file 1010 providing information and/or references about the contents of the application package 1000. An Android application package 1000 comprises a single manifest file, also referred to as AndroidManifest.xml, which comprises in accordance with a predetermined type of xml format, a sort of table of contents of the application package 1000;

A plurality of class files 1020, also referred to as classes.dex, which comprise parts of the application software in the form of bytecode. The bytecode of the classes.dex file, typically is portable machine-readable application code, which results from the compilation of human readable application code, typically application code written in the Java programming language. According to the embodiment shown, the plurality of class files 1020 form part of the application code 110 of the software application 100. As known to a man skilled in the art, alternative embodiments are possible of such an embodiment of the application package 1000 comprising at least one class file 1020;

A plurality of native code files 1030 comprising native code, for example known to a man skilled in the art as .so files. These native code files 1030 comprise native code, such as for example compiled software libraries comprising further compiled parts of the application code 110, for example written in the C or C++ programming language. Native code is machine readable application code which is compiled in function of execution on a particular operating system and/or type of processor and their corresponding set of instructions. Typically, such library files comprise a set of standard functionalities of the application code 110 from which the part of the application code 110 of the class files 1020 is dependent for their execution. It is clear, that alternative embodiments are possible such as known to the man skilled in the art, in which such a software package comprises none, one, two, three or any other suitable number of such native code files 1030, which typically provide for software libraries on which the execution of the class files 1020 depends;

A resource file 1040, which comprises smaller resources, such as for example data such as strings, colors, dimensions, . . . , for use by the application code 110 or any other suitable component of the software application 100. Typically, the data in the in the resource file 1040 allows for the flexibility of adapting the software application 100 in a suitable way for execution on different user devices, making use of different languages, . . . without the need to manipulate the application code 110 itself. As known to a man skilled in the art, such an embodiment of the software package 1000 comprises one such resource file 1040 also referred to as resources.arsc. As shown, such a resource file 1040 comprising such smaller resources forms part of the resources 150 of the software application 100;

Additional further resource files 1050 which comprise data files such as for example XML files, digital image files such as for example PNG files, etc. These further separate resource files 1050 comprise data elements for use in the layout, menus, icons, etc. of the software application 100, for use in different user devices, configured in different languages, etc. As known to a man skilled in the art, such optional further resource files 1050 are typically files arranged in a "res/*" folder of such a software package 1000. It is clear that according to alternative embodiments the software package could comprise none, one, two, three, or any other suitable number of such further resource files 1050. As shown, such further resource files 1050 also form part of the resources 150 which comprise data available to the application code 110 or any other suitable component of the software application 100, such as for example a manifest file 1010, a resource file 1040, etc.

Asset files 1060 which comprise raw data files which are made available to the application code 110. These asset files typically comprise for example text files or .txt files, non-Android XML files or .xml files, Audio files for example .wav files, .mp3 files, .mid files, . . . . As known to a man skilled in the art, such optional asset files 1050 are typically files arranged in an "assets/*" folder of such a software package 1000. It is clear that according to alternative embodiments the software package could comprise none, one, two, three, or any other suitable number of such asset files 1060. As shown, such asset files 1060 also form part of the resources 150 which comprise data available to the application code 110 of the software application 100.

It is clear that alternative examples of the software application 100 are possible to that of the embodiment of FIG. 2, as long as in general the software application 100 comprises application code 110. In general the software application 100 could optionally also comprise suitable resources 150 comprising data accessible by the application code 110 during execution of the software application 100.

As further shown in FIG. 2 and FIG. 3, the application partitioning system 10 is configured to determine a set 170 comprising a plurality of dependent application components 160. According to some embodiments such an application component 160 could comprise at least partly one of the items of the software application 100. According to the embodiment described above, an application component 160 could for example comprise at least partly a class file 1020, a native code file 1030, a resource file 1040, a further resource file 1050 or an asset file 1060. It is however clear, as shown in FIG. 2, that such an item of the software application 100 could also comprise a plurality of application components 160. For example, a plurality of application components could comprise a different part of the same native code file 1060, for example providing for different sets standard functionality as provided by a particular software library. As further shown, it is clear that also other items of the software application 100 such as a class file 1020, a resource file 1040, further resource files 1050, asset files 1060 could also comprise a suitable plurality of different application components 160. According to still further embodiments at least some of the application components correspond to such an item of the application code 110 or the resources 150 of the software application 100. According to the embodiment described above, each entry point 220, 230, 240 of the application code 110 is arranged in a separate application component 160. It is however clear that alternative embodiments are possible in which one or more of the entry points are arranged in the same application component 160, as long as in general there are two or more different entry points of the software application 100 which define two or more corresponding application features.

According to the embodiment described in FIG. 2, there is provided a first entry point 220 in an application component 160 of a class file 1020 for initiating the search functionality of the software application 100, a second entry point 230 in an application component of another class file 1020 for initiating the result list functionality of the software application 100 and a third entry point 240 for initiating the checkout functionality of the software application 100. It is clear that the set 170 of application components 160 as determined by the application partitioning system thus comprises all parts of the application code 110 and the optional resources 150 required for allowing execution of the software application 100. As is clear to a man skilled in the art, typically some of these application components 160 are dependent on other application components 160 for their execution. An application component 160 comprising at least a part of the application code 110 of a class file 1020 could for example depend for its execution on a plurality of standard classes, functions, methods, fields, etc. made available in another application component 160 comprising at least part of the application code of a native code file 1030 comprising a suitable software library. Additionally, this application component 160 comprising at least part of the class file 1020 could also be dependent on data available from one or more suitable application components 160 of the resources 150.

Figure 5:
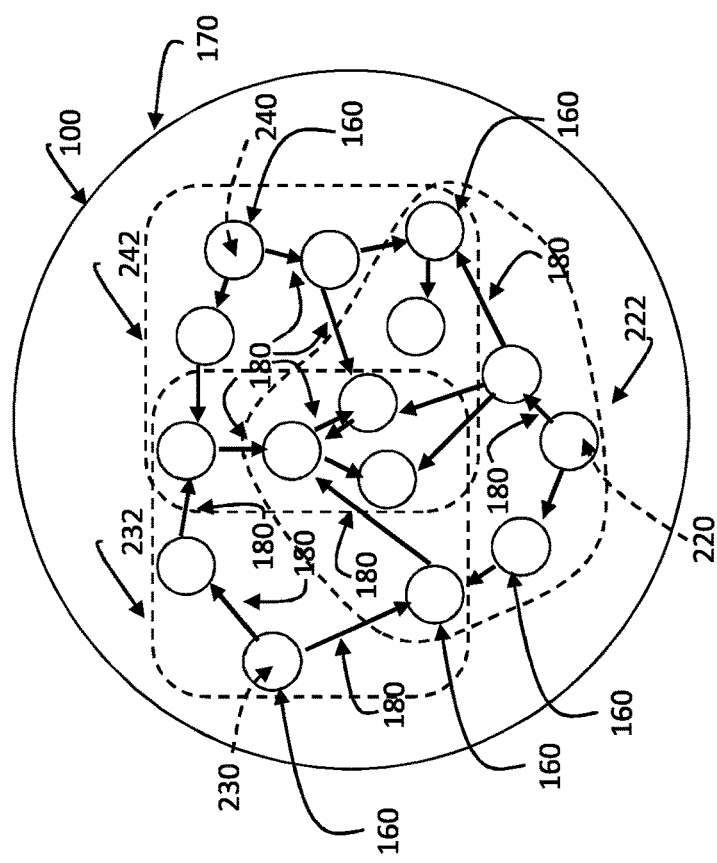

As schematically shown in FIG. 4, subsequently the application partitioning system 10 will execute a dependence analysis. As shown, starting from the application component 160 comprising entry point 230 all dependent application components 160 are determined from which the execution of the application component 160 directly or indirectly depends. These dependency relations 180 between these application components 160 are schematically represented by means of arrows 180. As shown in this way there is determined a corresponding entry point dependency subset 232 comprising all dependent application components 160 required for enabling execution of the corresponding application feature 132 are determined. It is clear that also for the other entry points 220, 240, as schematically shown in FIG. 5, similarly a respective corresponding entry point dependency subset 222, 242 is determined. It is clear that alternative embodiments are possible, as long as in general there is executed a dependence analysis in which, for each application component 160 comprising an entry point 220, 230, 240 of an application feature 122, 132, 142, there is determined a corresponding entry point dependency subset 222, 232, 242 comprising all dependent application components 160 required for enabling execution of the corresponding application feature 122, 132, 142. It is clear that all application components 160 of a particular entry point dependency subset 222, 232, 242 are coupled by means of one or more dependency relations 180 to the application component 160 comprising the corresponding entry point 220, 230, 240.

As schematically shown in FIG. 6, according to this embodiment, the automated application partitioning system 10 then groups the application components 160. As shown there are provided three feature subsets 224, 234, 244. The feature subset 224 comprises the application components 160 which are only part of the entry point dependency subset 222 comprising the application component 160 of which entry point 220 is part. This means that these application components 160 of the feature subset 224 are not part of the other entry point dependency subsets 232, 242. Similarly, the application components 160 which are only part of dependency subset 232 are grouped in a corresponding feature subset 234 and the application components which are only part of dependency subset 242 are grouped in a corresponding feature subset 244. It is clear that alternative embodiments are possible, as long as in general the automated application partitioning system 10 is configured to group the application components 160 in such a way that, for each entry point dependency subset, there is provided a corresponding feature subset respectively comprising application components 160 which are only part of the corresponding entry point dependency subset and are not part of another entry point dependency subset.

Figure 7:
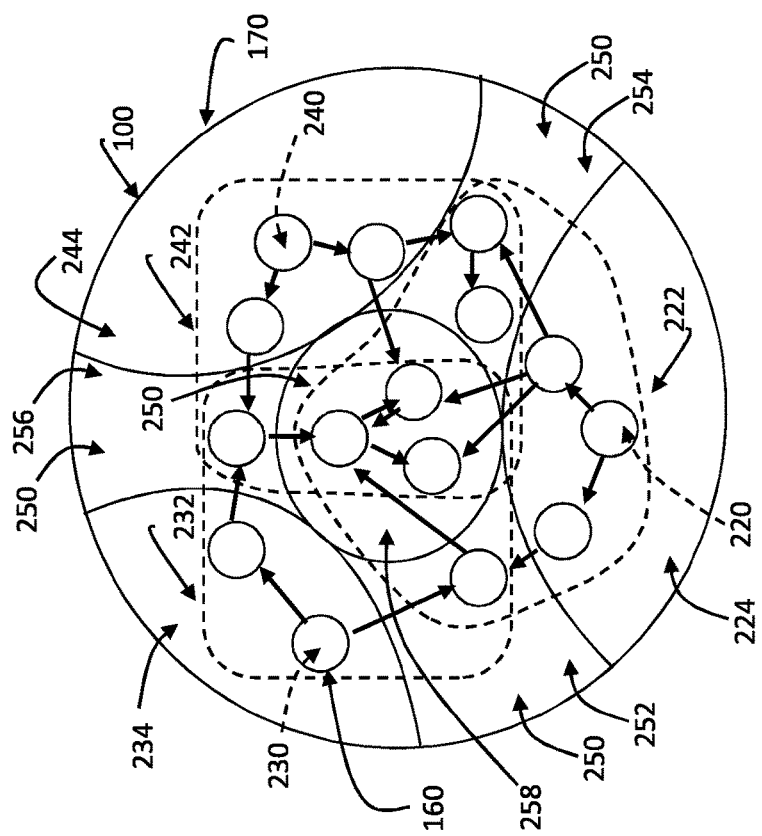

As further shown in FIG. 6, the automated application partitioning system 10 is further configured to group the application components 160 in such a way that one shared subset 250 is provided comprising all application components 160 which are part of a plurality of dependency subsets 222, 232, 242. According to an alternative embodiment, as schematically shown in FIG. 7, it is also possible to group the application components 160 in such a way that a plurality of shared subsets 250 are provided. Each of these shared subsets comprising application components 160 part of a plurality of dependency subsets. As shown for example shared subset 252 comprises application components 160 only part of both dependency subset 222 and 232. As further shown shared subset 254 comprises those of both dependency subset 232 and 242, shared subset 256, those only part of both dependency subset 242 and 222. Further, according to this embodiment shared subset 258 comprises the application components 160 part of all dependency subsets 222, 232 and 242. It is clear that still further alternative embodiments are possible, as long as in general the application partitioning system 10 provides at least one shared subset 250 grouping application components 160 part of a plurality of dependency subsets 222, 232, 242.

Preferably the application partitioning system 10 removes any application components 160 from the set 170 which are not part of at least one entry point dependency subset 222, 232, 242. This means for example that the software application is preferably screened for parts of the application code 110 or resources 150 which are not used during execution of the software application 100. These unused parts of the application code 110 or resources 150 provide for application components 160 which will not have any dependency to or from an application component 160 in which an entry point 220, 230, 240 is arranged. Such application components 160 can preferably be removed by the application partitioning system 10 in order to reduce the size of the partitioned application 102 and the application features 122, 132, 142.

It is clear that still further alternative embodiments are possible in which the application partitioning system 10 optimizes the partitioned application 102. For example, preferably the application code 110 is automatically adapted such that for the number of dependency relations 180 between the application components 160 of the set 170 is reduced. Additionally, any direct call for an application component 160 of another feature subset or shared subset is replaced by an indirect call to the location where that application component and its feature subset or shared subset will be retrievable. As will be explained below, this could for example be implemented by replacing such direct calls by means of a corresponding URL of the location where that application component and its feature subset or shared subset will be retrievable.

Figure 8:
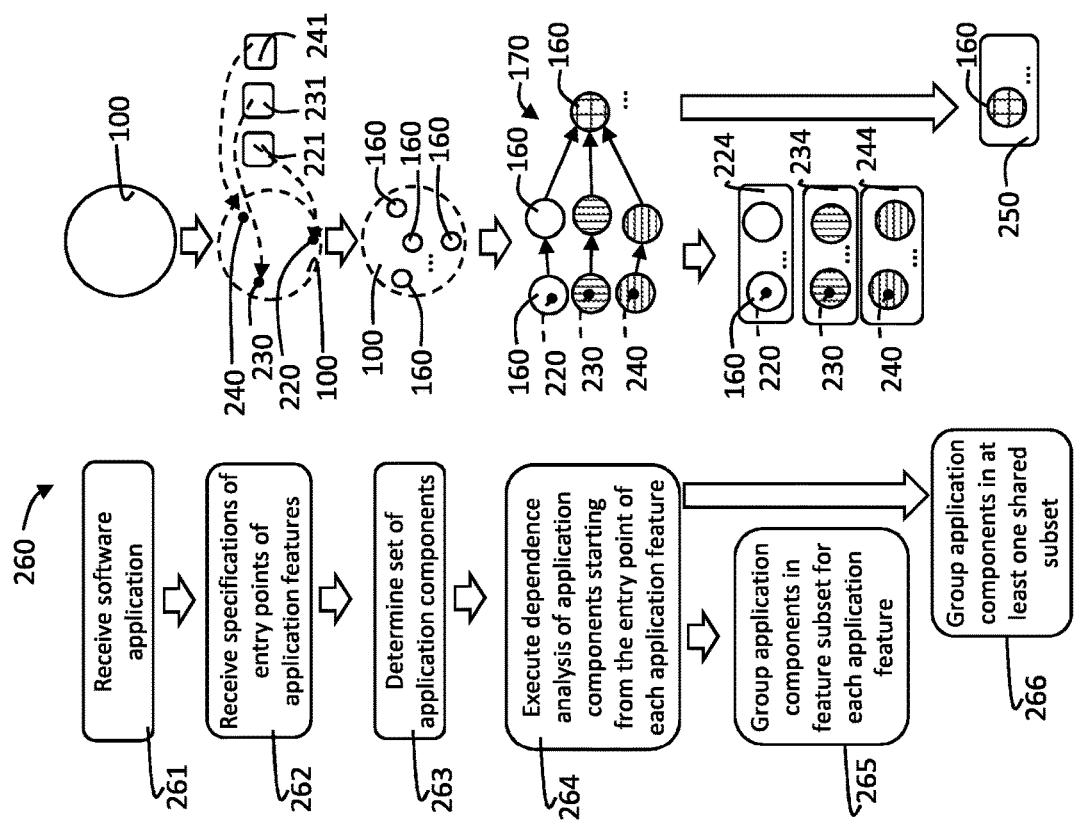
FIG. 8 shows an embodiment of a method of operating the automated application partitioning system.

FIG. 8 schematically shows an embodiment of the computer-implemented method 260 of operating the above-mentioned automated application partitioning system. As shown, according to this embodiment the computer-implemented method 260 receives a software application 100 at step 261 and specifications 221, 231, 241 of two or more different entry points 220, 230, 240 of the software application 100 at step 262. The specifications 221, 231, 241 of these different entry points 220, 230, 240 define two or more corresponding application features 122, 132, 142, as already mentioned above with reference to FIGS. 1-7. At step 263, as explained above with reference to FIGS. 3 to 7, there is determined a set 170 comprising a plurality of dependent application components 160 of the application features 122, 132, 142 of the software application 100. A dependence analysis is executed at step 264. As described above, the dependence analysis will, starting from the entry point 220, 230, 240 of each application feature 122, 132, 142, determine a corresponding entry point dependency subset 222, 232, 242. Each entry point dependency subset 222, 232, 242 thus comprises all dependent application components 160 required for enabling execution of its corresponding application feature 122, 132, 142. As further shown, at step 265 application components 160 are grouped in feature subsets 224, 234, 244, one for each application feature 122, 132, 142; or alternatively at step 266 in at least one shared subset 250 for shared use by a plurality of application features 122, 132, 142. As explained above, more specifically with reference to the embodiments of FIGS. 3 to 7, the application components 160 are grouped in such a way that for each entry point dependency subset 222, 232, 242 there is provided a corresponding feature subset 224, 234, 244 respectively comprising all application components 160 which are only part of the corresponding entry point dependency subset 224, 234, 244 and not of another entry point dependency subset 224, 234, 244. This thus typically means that, for each application feature 122, 132, 142, and thus for each entry point 220, 230, 240 of these application features 122, 132, 142, there will be provided a corresponding feature subset 224, 234, 244. Additionally, the application components 160 part of a plurality of entry point dependency subsets 222, 232, 242 will be grouped in at least one shared subset 250. As already explained above with reference to FIG. 7, according to a particular simple embodiment, there could be provided a single shared subset 250 comprising all application components 160 from which the execution of a plurality of application features 122, 132, 142 depends.

As will be explained in further detail below, and similar as shown with reference to the embodiment of FIG. 1, the automated application partitioning system in this way preferably generates the respective application features 122, 132, 142 as a software package. This for example means, as shown according to the embodiment one software package for each application feature 122, 132, 142, in which next to the corresponding feature subset of that application feature also any shared subset 250 from which this feature subset depends is integrated. However, it is clear that alternative embodiments are possible, for example in which each of the feature subsets are packaged individually, and also the one or more shared subsets are packaged individually. Optionally, the partitioned application 102 and for example the corresponding application packages of each application feature can be distributed in a grouped way, for example in the form of an archive, application package file, . . . which comprises the plurality of the application packages of the partitioned application 102. However, it is clear that the application features 122, 132, 142, after distribution, are accessible in an individual way, for example by making them available to end user devices individually at a particular correlation URL or any other suitable location, as will be explained in further detail below.

A particular embodiment will now be described which is compatible with the Android Instant App framework already mentioned above. It is however clear that alternative embodiments are possible offering similar advantages, such as for example present in the appended depending claims. According to this embodiment, the specification 200 comprising the entry point specifications 221, 231, 241 of the entry points 220, 230, 240 is provided as input to the automated application partitioning system 10 in the form of a configuration file. According to a particular implementation this configuration file, which embodies the specification 200, could be structured as for example illustrated below, in which there is provided one line for each entry point specification 221, 231, 241. As shown below, each line, and thus each entry point specification 221, 231, 241, for example comprises the name of the corresponding application feature of the entry point, a reference to the entry point and a URL providing the location where the application feature will be made available. As shown, according to this embodiment, the entry points are specified as an Android Activity class of the software application 100 as generally known to a man skilled in the art. According to such an embodiment, the entry point specifications thus specify the entry points by means of a reference to the name of this Android Activity class. Such an embodiment of the specification 200 in the form of a configuration file for the embodiment of FIG. 1, could for example comprise the following three entry point specifications 221, 231, 241:

instantappfeature search com.test.ecommerceApp.search
  http://ecommerce.test.com/search
instantappfeature resultlist com.test.ecommerceApp.resultlist
http:/ecommerce.test.com/resultlist
instantappfeature checkout com.test.ecommerceApp.checkout
http:/ecommerce.test.com/checkout It is clear that alternative embodiments are possible, such as for example providing the entry point specifications 221, 231, 241 of the entry points 220, 230, 241 in the manifest file of the software application package 1000, etc.

As further shown, according to an embodiment similar to that of FIGS. 1 to 6, the automated application partitioning system 10 will generate the respective application features 122, 132, 142 as a software package comprising the corresponding feature subset 224, 234, 244 and the shared subsets 250 from which this feature subset depends. Such software packages for the application features could be similarly structured as described with reference to FIG. 2, such for example a .apk package file, or any other suitable embodiment of such a software package. As already mentioned above, this thus means that the automated application partitioning system 10 will partition the software application 100 by for example automatically adapting the application code 110, the resources 150, the manifest file, . . . in such a way that the software application 100 is partitioned into the separate application packages of the application features 122, 132, 142. This partitioning could be performed before, during or after the build process of the software application and can be performed efficiently with an improved level of flexibility. According to this embodiment the automated partitioning system will for example output the following .apk package files:

ECommerce-release.apk
ECommerce-release-search.apk
ECommerce-release-resultlist.apk
ECommerce-release-checkout.apk According to such an embodiment the automated partitioning system could be configured to perform the following automated partitioning method comprising the steps of:

receiving compiled application code and resources of the software application during the build process, or alternatively receiving the software application as a software package;

modifying the manifest file, so it identifies the different application features, with their names, entry points, and URLs, such as for example described above;

modifying the bytecode of the application code, so it is better suited to be partitioned, for example by reducing the number of dependencies between different application components;

modifying the bytecode of the application code, such that application features will interact through their URLs instead of direct calls;

partitioning the application code and resources of the software application, by performing the above-mentioned dependence analysis for each application feature, starting from the entry point of the application feature. Application code and resources that are only needed in one application feature are marked to be included in only that application feature .apk file. Application code and resources that are needed in two or more application features are marked to be included in the base feature .apk file;

When applying the partitioning to the resources, particularly in the context of the Android Instant Apps framework, this requires that the numerical identifiers of the resources are renumbered, as grouped per feature. In such a case, also the following subsequent updates must be performed:

Updating the resource references with these updated numerical identifiers in the resource file resources.arsc;

Updating the resource references with these updated numerical identifiers in the further resource files;

Updating the resource references with these updated numerical identifiers in the bytecode in the classes.dex files.

Subsequently packaging the filtered application code and resources in the specified application feature .apk files. The application code and resources are filtered into these .apk files, based on the automatically computed partitioning as explained above. Depending on the type of application component, this filtering may happen on files of the software application as a whole or on parts of the file contents of these files. This for example means for the Android instant App framework that:

the manifest file AndroidManifest.xml is filtered into smaller versions, per application feature, except for the base feature;

the bytecode classes.dex files are filtered into smaller versions, per application feature;

the native code .so files, resource or asset files, such as .xml, .png, .mp3, . . . files are filtered as a whole. Each file ends up in exactly one application feature .apk software package.

Preferably the application partitioning system 10 also shrinks, optimizes, obfuscates, . . . the software application 100 before partitioning it as described above. Notably the shrinking step, in which for example application components without any dependency from the entry points are removed, is useful to reach a predetermined maximum size threshold, which is preferably in the range of 2 MB to 20 MB, preferably in the range of 2 MB to 6 MB, for example 4 MB.

It is clear that still further alternative embodiments are possible, more particularly the automated application partitioning system could for example be part of or coupled to a suitable build system, such that it can execute its automated application partitioning method before, during or after a build operation of the software application. It is further clear that the automated application partitioning system could for example be part of or coupled to software applications for use during a build operation, for example for optimizing, securing, . . . a software application. One example of such a known software application is for example known as ProGuard, available at http://proguard.sourceforge.net/. Proguard is a known software application for use during a build operation, which for example reduces the size of the software application by making use of a dependence analysis for detecting and removing unused application components such as classes, fields, methods, resources, etc. An alternative known software application for use during the build operation is DexGuard available at http://www.guardsquare.com/dexguard. Dexguard focuses on the protection of mobile software applications, with additional features such as for example resource obfuscation, string encryption, class encryption, and executable application file splitting. DexGuard is focussed on Android applications and directly creates Dalvik bytecode during the Android build operation in which Android programs are compiled into .dex or Dalvik Executable files, which are in turn packaged into a software package or .apk file. Such known software applications, during the build operation, make use of dependence analysis of application components, such as classes, fields, methods, resources, etc, to detect unused application components which can be removed to reduce the size and increase the efficiency of the software application. Still a further alternative known software application is known as iXGuard available at https://www.guardsquare.com/ixguard and provides similar functionality for software applications for the iOS operating system. It is clear that, the functionality of this dependence analysis of the application components already available in these such existing software applications which are aimed at detecting unused application components, can according to particular embodiments be made available in a shared or integrated way to the automated application partitioning system. In this way, the automated application partitioning system could thus for example be easily integrated with such abovementioned software applications such as ProGuard, DexGuard, etc.

Figure 9:
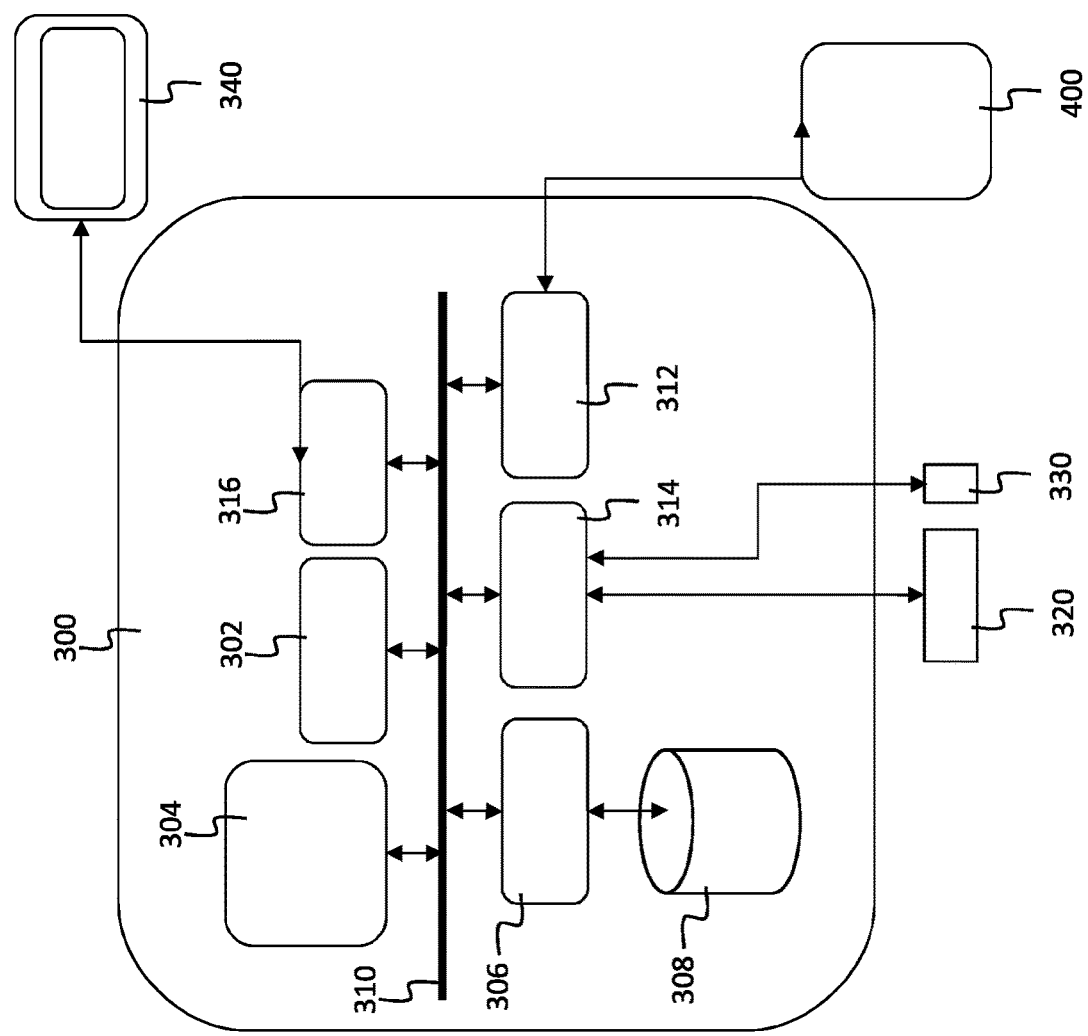
FIG. 9 shows a suitable computing system for implementing the embodiments of FIGS. 1-8.

FIG. 9 shows a suitable computing system 300, 400 for hosting the automated application partitioning system 10 or any of its components as described with reference to the above-mentioned embodiments. Computing system 300 may in general be formed as a suitable general-purpose computer and comprise a bus 310, a processor 302, a local memory 304, one or more optional input interfaces 314, one or more optional output interfaces 316, a communication interface 312, a storage element interface 306 and one or more storage elements 308. Bus 310 may comprise one or more conductors that permit communication among the components of the computing system. Processor 302 may include any type of conventional processor or microprocessor that interprets and executes programming instructions. Local memory 304 may include a random access memory (RAM) or another type of dynamic storage device that stores information and instructions for execution by processor 302 and/or a read only memory (ROM) or another type of static storage device that stores static information and instructions for use by processor 302. Input interface 314 may comprise one or more conventional mechanisms that permit an operator to input information to the computing device 300, such as a keyboard 320, a mouse 330, a pen, voice recognition and/or biometric mechanisms, etc. Output interface 316 may comprise one or more conventional mechanisms that output information to the operator, such as a display 340, a printer, a speaker, etc. Communication interface 312 may comprise one or more transceiver-like mechanisms such as for example two 1 Gb Ethernet interfaces that enables computing system 300 to communicate with other devices and/or systems, for example mechanisms for communicating with one or more other computing systems 400. The communication interface 312 of computing system 300 may be connected to such another computing system 400 by means of a local area network (LAN) or a wide area network (WAN), such as for example the internet. Storage element interface 306 may comprise a storage interface such as for example a Serial Advanced Technology Attachment (SATA) interface or a Small Computer System Interface (SCSI) for connecting bus 310 to one or more storage elements 308, such as one or more local disks, for example 1 TB SATA disk drives, and control the reading and writing of data to and/or from these storage elements 308. Although the storage elements 308 above is described as a local disk, in general any other suitable computer-readable media such as a removable magnetic disk, optical storage media such as a CD or DVD, -ROM disk, solid state drives, flash memory cards, . . . could be used.

The automated application partitioning system 10 according to the above-mentioned embodiments could be part of a suitable build automation utility running on a computing system 300 locally available to a developer, such as a personal computer, laptop, etc. or on a remotely accessible computing system such as one or more servers available to a plurality of application developers. Alternatively, the automated application partitioning system 10 may also be part of build automation servers, for example comprising web based build tools, which execute build automation utilities on a scheduled or triggered basis, such as for example a continuous integration server. It is clear that the automated application partitioning system 10, etc. and their associated computer implemented method of operation, can be implemented as programming instructions stored in the local memory 304 of the computing system 300 for execution by its processor 302. Alternatively, these components could be stored on the storage element 308 or be accessible from another computing system 400 through the communication interface 312. In general, in this way the automated application partitioning system 10 and the associated computer implemented method are provided as a computer program comprising software code adapted to perform this computer-implemented method when executed by a computing system. Alternatively, the automated application partitioning system 10 and the associated computer implemented method could also be provided as a computer readable storage medium comprising computer-executable instructions which, when executed by a computing system, perform the computer-implemented method.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein. This is especially the case for the embodiments described above which refer to a single build tool plugin and/or a single application component. It is clear that these embodiments are disclosed in a manner sufficiently clear and complete for a skilled person to apply that teaching to embodiments making use of two or more build tool plugins for processing a plurality of application components.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An automated application partitioning system, configured to:
    process a software application comprising:
        application code, and
        resources comprising data available to the application code of the software application;
    receive entry point specifications of two or more different entry points of the software application, defining two or more corresponding application features;
    determine a set comprising a plurality of dependent application components of the application features of the software application, wherein each dependent application component respectively comprises:
        a part of the application code of the software application, and/or
        a part of the resources;
    execute a dependence analysis in which, for each application feature, starting from an entry point of the application feature, there is determined a corresponding entry point dependency subset comprising all dependent application components required for enabling execution of the application feature; and
    group the dependent application components from the dependence analysis, such that there is provided:
        for each entry point dependency subset, a corresponding feature subset respectively comprising all dependent application components which are only part of the corresponding entry point dependency subset and not of another entry point dependency subset; and
        at least one shared subset forming a base feature partition of the software application comprising the dependent application components that comprise the parts of the application code and the parts of the resources that are part of a plurality of dependency subsets, said dependent application components of the at least one shared subset comprising the code and the resources shared among a plurality of the application features of the software application.

2. The automated application partitioning system according to claim 1, wherein the automated application partitioning system is configured to group the dependent application components such that there is provided one shared subset comprising all application components part of a plurality of dependency subsets.

3. The automated application partitioning system according to claim 1, wherein the automated application partitioning system is further configured to remove any application components from the set which are not part of at least one entry point dependency subset.

4. The automated application partitioning system according to claim 1, wherein the software application is automatically adapted such that for a number of dependency relations between the dependent application components of the set is reduced.

5. The automated application partitioning system according to claim 1, wherein the automated application partitioning system is further configured to replace any direct call for an application component of another feature subset or shared subset by an indirect call to the location where that application component and its feature subset or shared subset will be retrievable.

6. The automated application partitioning system according to claim 1, wherein:
    the software application is received as a software package;
    the entry point specifications of two or more entry points are received as part of a configuration file for the automated application partitioning system.

7. The automated application partitioning system according to claim 1, wherein the automated application partitioning system is further configured to generate the respective application features as a software package comprising the corresponding feature subset and the shared subsets from which the corresponding feature subset depends.

8. The automated application partitioning system according to claim 1, wherein the application code comprises one or more of the following:
   source code;
   byte code;
   native code.

9. The automated application partitioning system according to claim 1, wherein the automated application partitioning system is further configured to group the dependent application components, such that each feature subset and/or shared subset is respectively smaller than or equal to a predetermined maximum size threshold.

10. The automated application partitioning system according to claim 1, wherein a predetermined maximum size threshold is preferably in a range of 2 MB to 20 MB.

11. A computer implemented method for operating the automated application partitioning system according to claim 1, the method comprising:
   processing a software application comprising:
      application code, and
      resources comprising data available to the application code of the software application;
   receiving entry point specifications of two or more different entry points of the software application thereby defining two or more corresponding application features;
   determining a set comprising a plurality of dependent application components of the application features of the software application, wherein each dependent application component respectively comprises:
      a part of the application code of the software application, and/or
      a part of the resources;
   executing a dependence analysis in which, for each application feature, starting from the entry point of the application feature, there is determined a corresponding entry point dependency subset comprising all dependent application components required for enabling execution of the application feature; and
   group the dependent application components from the dependence analysis, such that there is provided:
      for each entry point dependency subset, a corresponding feature subset respectively comprising all dependent application components which are only part of the corresponding entry point dependency subset and not of another entry point dependency subset; and
      at least one shared subset forming a base feature partition of the software application comprising the dependent application components that comprise the parts of the application code and the parts of the resources that are part of a plurality of dependency subsets, said dependent application components of the at least one shared subset comprising the code and the resources shared among a plurality of the application features of the software application.

12. A non-transitory computer readable storage medium comprising computer-executable instructions which, when executed by a computing system, perform the computer-implemented method according to claim 11.

* * * * *

UNITED STATES PATENT AND TRADEMARK OFFICE
CERTIFICATE OF CORRECTION

PATENT NO. : 11,221,844 B2  
APPLICATION NO. : 16/110065  
DATED : January 11, 2022  
INVENTOR(S) : Lafortune Page 1 of 1

It is certified that error appears in the above-identified patent and that said Letters Patent is hereby corrected as shown below:

On the Title Page

"(65) Prior Publication Data  
US 2019/0079756 A1  Mar. 14, 2019"

Should read:  
-- (65) Prior Publication Data  
US 2019/0079756 A1  Mar. 14, 2019

(30) Foreign Application Priority Data  
Sep. 8, 2017 (EP)..........................17190250.5 --

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*